United States Patent [19]

Williamson

[11] 4,433,419

[45] Feb. 21, 1984

[54] ELECTRODE PURGE SLEEVE FOR GLASS MELTING FURNACES

[75] Inventor: Michael Williamson, Newark, Ohio

[73] Assignee: Owens-Corning Fiberglas Corporation, Toledo, Ohio

[21] Appl. No.: 371,159

[22] Filed: Apr. 23, 1982

[51] Int. Cl.[3] .................... C03B 5/027

[52] U.S. Cl. .................... 373/37

[58] Field of Search .................... 373/27, 36, 37, 38, 373/120, 114

[56] References Cited

U.S. PATENT DOCUMENTS 3,777,040 12/1973 Gell et al. .................... 373/37

4,287,380 9/1981 Fairbanks et al. .

4,287,381 11/1979 Montgomery .

4,291,190 9/1981 Elsner et al. .

*Primary Examiner*—Roy N. Envall, Jr.

*Attorney, Agent, or Firm*—Ronald C. Hudgens; Patrick P. Pacella; Ronald E. Champion

[57] ABSTRACT

The disclosure is directed to an elecrode purge sleeve assembly for high temperature oxidizable electrodes used in electrical heating of molten material and more particularly a purge sleeve for glass melting furnaces wherein a standard size tube of high temperature material slightly larger in its interior dimension than the exterior of the electrode extends over the portion of the length of the electrode subject to degradation and is sealed thereto as well as being supported thereby, the sleeve being arranged to receive an inert gas under low pressure to prevent seepage of atmospheric gases to the portion of the electrode being protected.

12 Claims, 4 Drawing Figures

ELECTRODE PURGE SLEEVE FOR GLASS MELTING FURNACES

TECHNICAL FIELD

The present invention is an electrode purge sleeve assembly for electrical heating of molten material in furnaces, particularly glass melting furnaces wherein sleeves are used to provide an inert region about otherwise oxidizable electrodes. Electrode material, such as conventionally used molybdenum, when exposed to oxygen at a high temperature such as in the order of above 600° F., oxidizes in an open atmosphere and progressively deteriorates to molybdenum oxide and in effect burns away. In general practice, purge gas is supplied to such electrodes of an electrical furnace within the space of an annular box-like construction surrounding the hot portions of the electrode subject to oxidation. The cost of such construction, however, is relatively high compared to the construction of the present invention, and the size of the assembly is also much larger and relatively cumbersome to install and remove.

THE INVENTION

According to the present invention, both the cost of a purge sleeve and its adaptability to installation and replacement are appreciably improved. This is accomplished by replacing the box-like assembly with a tubular sleeve which can be a length pipe of standard size made of high temperature material such as Inconel steel having an internal diameter slightly larger than the region of the electrode about which it is to be mounted.

The sleeve is supported on the side of a furnace flow channel with the electrode extending through the refractory wall of the channel to the zone to be heated. At the end nearest the furnace the sleeve is surrounded by a gasket in an annular recess provided in the outside of the refractory wall of the furnace. The opposite end of the sleeve is sealed by a gasketed annular pipe collar or end cap threadedly secured to the end of the sleeve. The sleeve thus is supported on the electrode over its length, and gas seals are provided at both ends, one in the region of the refractory wall and at the other end within a standard slip joint nut or end cap.

Gas is supplied to the small space between the interior of the sleeve and the exterior of the electrode through a gas inlet at the side of the sleeve. The electrodes can be any of a number of sizes but generally have a diameter in the range of 1 to 3 inches. Gas such as nitrogen is introduced into the sleeve at a slight pressure above atmospheric to prevent seepage of atmospheric gases to its interior. Pressure within the sleeve can be sensed by instrument means connected by way of a tap to the sleeve.

The prime objective of the invention is to provide a low cost and small electrode assembly which will supply the purge gas about the high temperature deteriorable portions of heated electrodes of an electric melting furnace to facilitate stable electrical operation of the furnace.

More specifically, an object of the invention is to provide a purge sleeve construction which will provide protection for molybdenum electrodes from contact with oxygen of the atmosphere in regions where the electrode sections operate at temperatures above 600° F.

Another objective of the invention is to provide a purge sleeve assembly for electrodes of electrically operated melting furnaces in which the sleeve itself is of commercial standard size components to reduce costs and which can be constructed of a readily available high temperature material such as Inconel steel.

Still another object of the invention is to provide an electrode purge sleeve which will encase the high temperature regions of a heating electrode which otherwise would be subject to oxidation in the regions outside the furnace and to provide an envelope of inert gas therefor, such construction being capable of fabrication and assembly at a minimum of cost in addition to being capable of ready mounting and replacement.

A further object of the invention is to provide an improved purge sleeve construction readily adaptable to connection thereto of a supply of inert gas such as nitrogen and connection of means for sensing static pressure of the gas supplied therein for a check of operation of the assembly.

Features of the invention are its simple low cost lightweight construction and its adaptability to ready and easy installation in a refractory wall of a furnace as well as being readily replaceable if difficulties are confronted.

As another important feature, the assembly is a compact small construction which allows it to be installed in closely packed relation with associated electrodes.

Still another feature of the invention is its ready adaptability to combination, if desired, with other furnace components, sucy as jack bolts and water jacekts by provision of easily welded on tabs.

Further objects and features are within the scope of this invention such as relate to the arrangement, operation and function of the related elements of the structure and their combination, and to economics of manufacture which will be apparent from a consideration of the specification and drawing in which.

Figure 1:
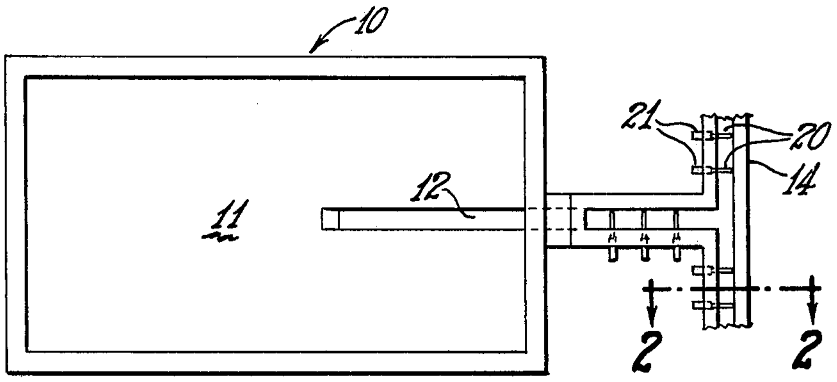
FIG. 1 is a schematic illustration of a glass melting furnace showing an outlet channel and a portion of a forehearth arranged for electrical heating by electrodes provided with purge sleeve assemblies of the present invention.

Referring to the drawings in detail and initially to FIG. 1, there is illustrated a glass melting furnace 10 having a melting region 11 provided with a depressed exit slot 12 through which molten glass is fed to the forehearth 14. Spaced heating electrodes 20 project into a channel 15 at the forehearth from positions exterior of the forehearth where the purge sleeves 21 are provided about the electrodes in the zones where they become excessively hot during operation.

Figure 2:
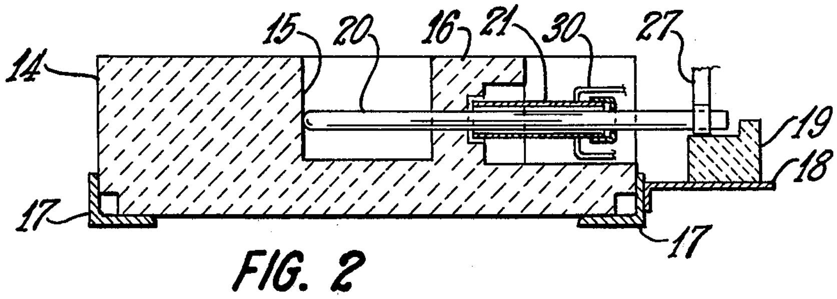
FIG. 2 is a cross-sectional view of the forehearth as viewed from line 2—2 of FIG. 1 and showing the purge sleeve assembly of the present invention on a heating electrode in the forehearth channel.
Figure 4:
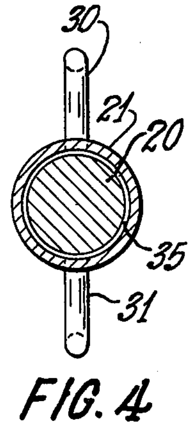
FIG. 4 is a cross-sectional view of the purge sleeve assembly of FIG. 3 as taken on line 4—4 thereof.
Figure 3:
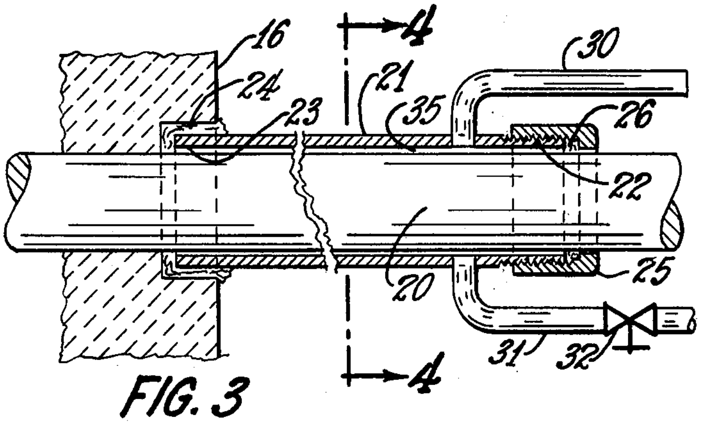
FIG. 3 is an enlarged view of a portion of the electrode assembly of FIG. 2 showing the purge sleeve assembly in greater detail.

As may be seen more clearly in FIGS. 2, 3 and 4, according to the present invention, the electrodes 20 each are mounted to project through a refractory wall 16 of the forehearth and channel 15 and to extend in a horizontal direction. The forehearth refractory is supported on angle members 17 on which a supporting platform 18 is secured such as by being welded thereto.

The platform 18 provides a base for fire brick support 19 for the exposed end of the electrode 20. An electric connection can be made conveniently to the electrode in this location by way of an electrical connector 27. Thus, the electrode and sleeve assembly is supported between the refractory wall 16 of the forehearth and the fire brick support 19 at its exposed end.

The enlarged illustration in FIG. 3 shows in greater detail the arrangement by which the purge sleeve 21 is supported on the electrode 20. The sleeve 21 is basically a length of pipe extending over a sufficient length of the electrode which is likely subject to oxidation attack by the atmosphere during operation, and, at its refractory wall end 23, it projects into an annular recess in the refractory wall 16 where it is provided with a high temperature gasket 24 overlapping the end of the sleeve and about the circumference of the end to seal the end against leakage of gas therefrom. The opposite end of the sleeve 21 is threaded and can be provided with a threaded end cap 25 provided with an opening therethough through which the electrode 21 can extend for connection of a source of electric energy thereto. A gas sealing gasket 26 is provided within the end cap 25 to correspondingly prevent leakage of the gas from the interior of the sleeve.

A gas inlet tube 30 is connected to a side of the sleeve to permit introduction of inert gas such as nitrogen thereto under pressure. The gas is under a slight pressure above atmospheric such as less than one pound pressure to assure that atmospheric gas does not seep into the sleeve. To assure that the pressure is maintained at an adequate level, a pressure instrument tap line 31 is connected to the sleeve to sense and monitor the pressure of gas therein. A valve 32 located in the instrument tap line 31 facilitates purging of unwanted gases from the sleeve at startup.

FIG. 4 illustrates the small gap 25 between the sleeve 21 and the electrode 20 within which the inert gas is introduced. Although the gap between the sleeve and the electrode, which need only be a few thousandths of an inch, is illustrated as concentric with the electrode, such concentricity is not essential in that the sleeve can rest on the electrode and make supporting contact therewith without detracting from the operation and protection provided by the sleeve. That is, the sleeve prevents access of atmosphere containing oxygen to the electrode and the fact that the sleeve may rest on the electrode is not detracting in that its light weight allows such support without placing an excess physical load on the electrode. In addition, the length of the sleeve 21 need not be excessive and can be kept to the minimum in length and weight required to protect the high temperature zone which otherwise might be subjected to oxidation. Thus, the sleeve construction is inherently of light weight by reason of its minimum diameter and minimum length, thereby facilitating ready installation and close packing of electrodes in a furnace assembly. Beside being simple in construction and economical in construction as well as easy to install, the concept of the present invention lends itself to economical customized adaptation to a wide variety of electrode constructions.

Upon initial start up of the purge sleeve 21 to provide the intended protection against extraneous gases, principally oxygen, the pressure tap 31 is first arranged to be free of connection to other devices. Gas is then introduced into the inlet tap 30 under pressure. Although the inlet 30 is illustrated as being at the top of the assembled sleeve, it can be located at any portion about the sleeve circumference. Gas is allowed to continue to flow into the space between the electrode 20 and the sleeve 21 until the inert gas permeates throughout the space 35. Valve 32 is then closed, and the gas is maintained within the sleeve under pressure applied to the inlet tap 30. Instruments and alarms may then be connected to the pressure tap line 31 for monitoring of pressure.

It will be apparent, therefore, that within the scope of the invention, modifications and different arrangements may be made other than as herein disclosed, and the present invention is merely illustrative, the invention comprehending all variations thereof.

I claim:

1. A gas purge sleeve assembly for an electric heating electrode mounted horizontally in a forehearth of a furnace comprising in combination with an electric heating electrode made of a material subject to attack and deterioriztion by the atmosphere under high temperature operating conditions, a tubular section having an internal configuration conforming to that of the exterior of the electrode in the region to be protected against atmospheric attack and an internal dimension slightly larger than said electrode portion, said tubular section extending over a length of the electrode from the refractory wall of the forehearth through which the electrode extends to a position along the length of the electrode safely beyond that which, during operation of the electrode, reaches a high temperature at which the electrode material is subject to deterioriation by attack of atmospheric gases, said tubular section being sealed against gas leakage at said wall and being provided with a second gas seal against leakage of gas therefrom at the opposite end of said tubular section being provided with a gas inlet means for supply of inert gas thereto under pressure, a gas outlet means having a closing valve associated therewith, whereby gas can be released from said tubular section to purge atmospheric gases from said sealed tubular section and to which pressure instrumentation may be connected for monitoring of the internal pressure of inert gas supplied to said section.

2. A gas purge sleeve assembly as defined in claim 1 wherein cross section of the electrode is circular and said sleeve is a section of pipe of commercial standard size.

3. A gas purge sleeve assembly as defined in claim 1 wherein the seal at said opposite end of the sleeve is provided within a collar about the electrode in a lower temperature region of the electrode safe against attack by gas of the atmosphere.

4. A gas purge sleeve assembly for a melting furnace heating electrode as defined in claim 1 having a gas inlet supply tube and a gas outlet tap both connected to and through the wall of said tubular section to the space between said electrode and the interior of said sleeve.

5. A gas purge sleeve as defined in claim 1 in which the electrode is a molybdenum electrode.

6. A gas purge sleeve as defined in claim 5 wherein the sleeve is made of high temperature steel.

7. A gas purge sleeve as defined in claim 1 wherein the sleeve is made of Inconel steel.

8. A gas purge sleeve assembly as defined in claim 1 wherein the tubular section rests on the electrode generally over its length.

9. A gas purge assembly as defined in claim 7 in which gas is maintained under pressure within said tubular section at a pressure less than one pound above atmospheric pressure to prevent seepage of atmospheric gases therein.

10. In the forehearth of a glass melting furnace having electrodes extending horizontally through aperatures in the refractory wall of the forehearth, means for protecting each of said electrodes from oxidation comprising:

a. a high temperature oxidation resisting metal sleeve around said electrode extending partly into said aperature;

b. a means to seal the first end of the metal sleeve against said refractory wall at said aperature;

c. a means to seal the second end of the metallic sleeve against said electrode in a region of said electrode not subject to oxidation;

d. a gas inlet means for supply of inert gas under pressure to the region between the interior of the metal sleeve and the exterior of the electrode;

e. a gas outlet means having a closing valve associated therewith whereby gas can be released from said tubular section to purge atmospheric gases from said sealed tubular section; and f. instrumentation means attached to said gas outlet means for monitoring the pressure of the inert gas between said metallic sleeve and said electrode.

11. A gas purge sleeve as defined in claim 10 in which the electrode is a molybdenum electrode.

12. A gas purge sleeve as defined in claim 10 in which the metallic sleeve is constructed of stainless steel.

* * * * *